United States Patent
Yamada et al.

(10) Patent No.: US 7,032,468 B2
(45) Date of Patent: Apr. 25, 2006

(54) VEHICLE WEIGHT DETERMINING DEVICE

(75) Inventors: Naoki Yamada, Aichi-ken (JP);
Toshiaki Ishiguro, Chita (JP); Hiroaki Kato, Kuwana (JP); Kisaburo Hayakawa, Aichi-ken (JP); Masataka Osawa, Aichi-ken (JP); Ryoichi Hibino, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 189 days.

(21) Appl. No.: 10/150,944

(22) Filed: May 21, 2002

(65) Prior Publication Data
US 2005/0000305 A1    Jan. 6, 2005

(30) Foreign Application Priority Data
May 21, 2001 (JP) ............................ 2001-150797

(51) Int. Cl.
*G01G 19/03* (2006.01)
*G01G 9/00* (2006.01)
(52) U.S. Cl. ........................................ 73/865; 702/175
(58) Field of Classification Search ................. 73/865; 702/141, 173–175, 189–195; 701/70
See application file for complete search history.

(56) References Cited

U.S. PATENT DOCUMENTS

| 5,490,063 A | 2/1996 | Genise |
| 6,347,269 B1 * | 2/2002 | Hayakawa et al. ..... 702/175 X |
| 2005/0010356 A1 * | 1/2005 | Ishiguro et al. ............. 701/124 |

FOREIGN PATENT DOCUMENTS

| JP | 6-147304 A | 5/1994 |
| JP | 2000-213981 A | 8/2000 |

* cited by examiner

*Primary Examiner*—Thomas P. Noland
(74) *Attorney, Agent, or Firm*—Buchanan Ingersoll PC

(57) ABSTRACT

The vehicle weight determination device includes a microcomputer for achieving the vehicle weight determination by obtaining a driving force after filtering based on the speed ratio of the torque converter and obtaining an integrated driving force with the absolute value of the driving force after filtering by using an area method. Similarly, acceleration after filtering is obtained by filtering process of the acceleration and an integrated to obtain an integrated acceleration. The vehicle weight is determined by the integrated driving force divided by the integrated acceleration.

1 Claim, 17 Drawing Sheets

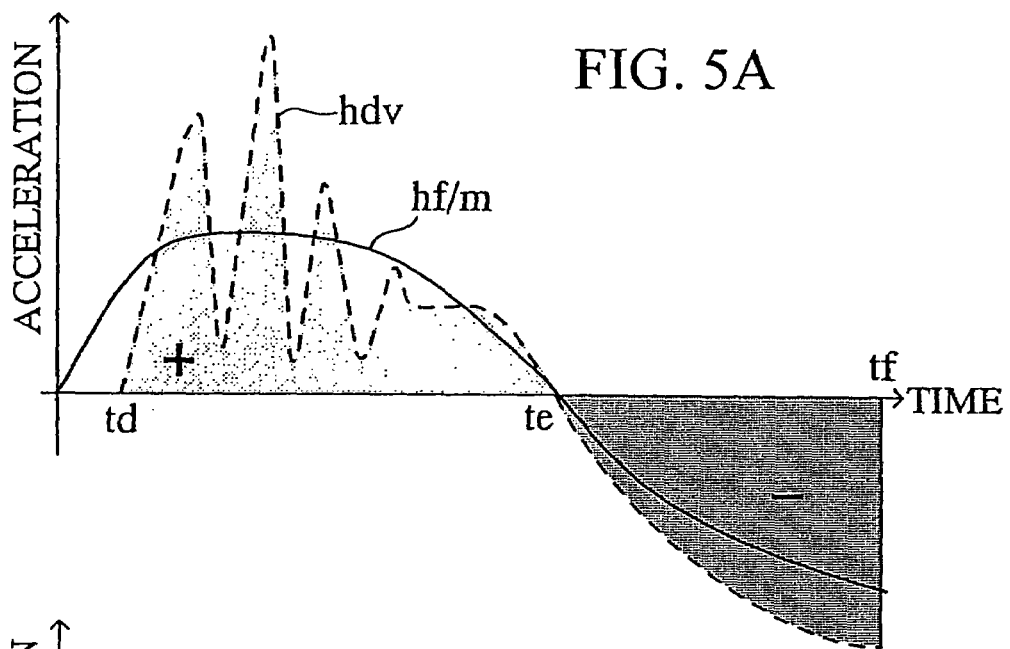
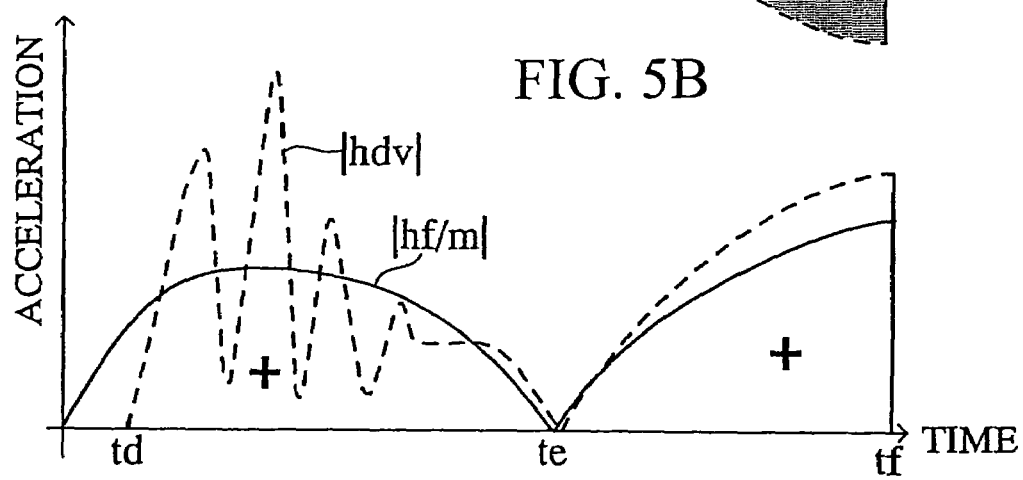

FIG. 8A
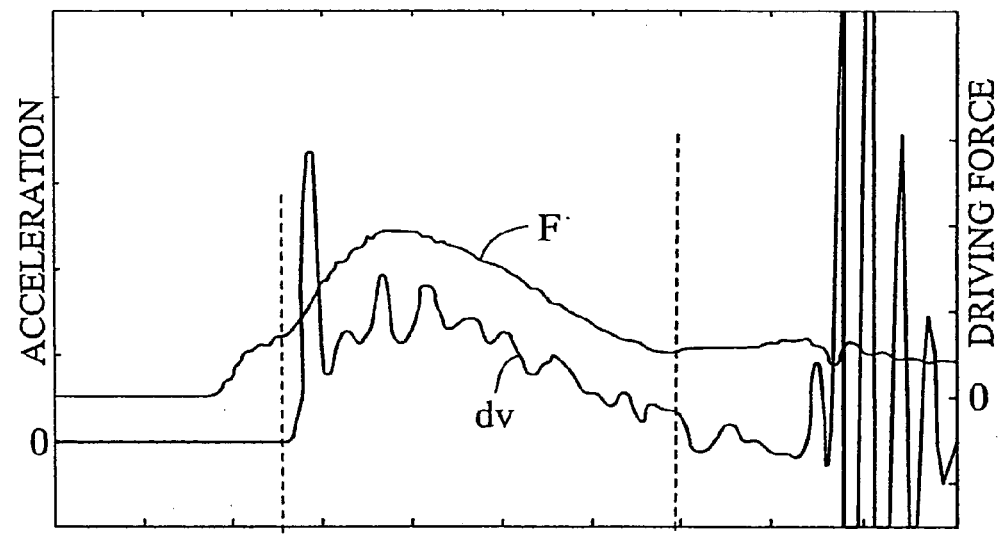
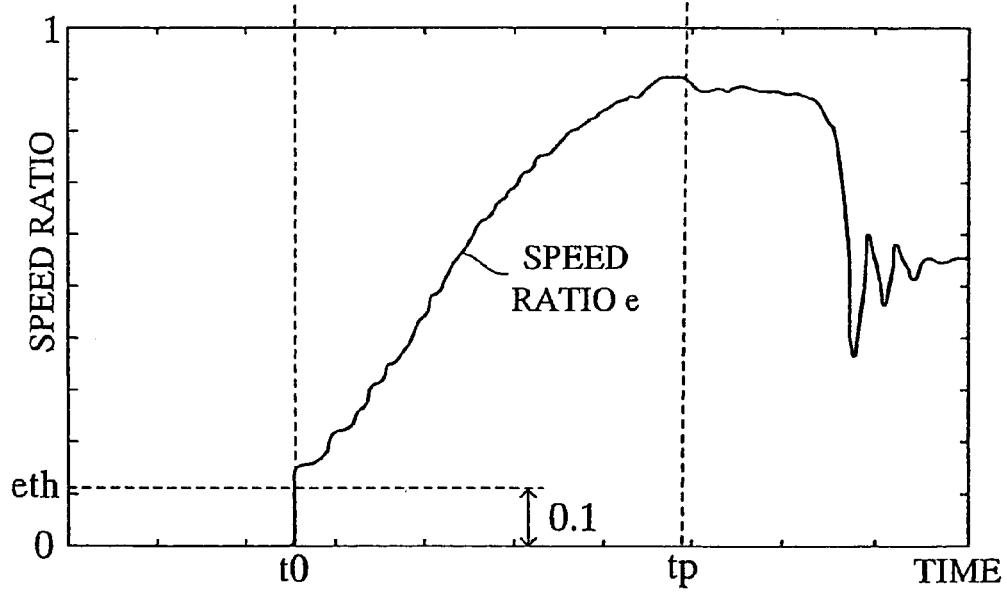
FIG. 8B

VEHICLE WEIGHT DETERMINING DEVICE

CROSS REFERENCE TO RELATED APPLICATIONS

The present application is based on and claims priority under 35 U.S.C § 119 with respect to Japanese Patent Application No.2001-150797 filed on May 21, 2001 the entire content of which is incorporated herein by reference.

FIELD OF THE INVENTION

The present invention is generally directed to a vehicle weight determination device for determining weight of a vehicle for determination of speed change stage of an automatic transmission.

BACKGROUND OF THE INVENTION

Conventionally, the speed change stage is determined based on the vehicle speed and throttle valve opening degree of the engine (acceleration pedal operation amount) for the speed change control device of an automatic transmission for vehicle. Another method for determining the speed change stage is known. In this method, the vehicle weight, which is variable depending on the number of passenger or the loaded condition of the vehicles is calculated based on the vehicle acceleration and the driving force applied to the vehicle and such calculated vehicle weight is used for determining the speed change stage of the automatic transmission control device to improve the engine brake performance during the vehicle being running on a down slope or to improve the acceleration performance during the vehicle being running on an up slope.

Such weight determination method is disclosed in a Japanese Patent Laid-Open publication No. 2000-213981. This conventional device calculates the vehicle weight based on filtered acceleration and driving force for removing any road inclination factors by filtering the detected acceleration and driving force using high-pass filter. In this method, filtering is processed at the point where the influence of the road inclination appears as the low frequency component.

However, in the above structure, due to the fact that the acceleration is largely changed or fluctuated by the torsion of drive train of the vehicle and the torsion or vibration of the suspension system of the vehicle, which problems are not yet sufficiently solved, the determination accuracy is not sufficiently achieved.

SUMMARY OF THE INVENTION

The present invention has been developed to satisfy the needs noted above and it is an object of the present invention to achieve an accurate vehicle weight determination for determining the speed change stage of an automatic transmission.

According to one aspect of the invention, the vehicle weight determination device includes an acceleration detecting means for detecting vehicle acceleration; a driving force determining means for determining vehicle driving force; an acceleration obtaining means for obtaining an acceleration after filtering by removing low frequency component included in the detected acceleration by the acceleration detecting means; a driving force obtaining means for obtaining a driving force after filtering by removing a low frequency component included in the determined driving force determined by the driving force determining means; an acceleration integrating means for integrating a value corresponding to the absolute value of the acceleration after filtering for a predetermined period of time to obtain an integrated acceleration value; a driving force integrating means for integrating a value corresponding to the absolute value of the driving force after filtering for the predetermined period of time to obtain an integrated driving force value; and a vehicle weight determining means for determining a vehicle weight based on the integrated acceleration value and the integrated driving force value.

According to another aspect of the invention, the vehicle weight determination device includes an acceleration detecting means for detecting vehicle acceleration; a driving force determining means for determining vehicle driving force; an acceleration integrating means for integrating a value corresponding to the detected acceleration value for a predetermined period of time by multiplying a coefficient which becomes greater in accordance with the lapse of time from the initiation of the integration to obtain an integrated acceleration value; a driving force integrating means for integrating a value corresponding to the determined driving force value for the predetermined period of time by multiplying the coefficient to obtain an integrated driving force value and a vehicle weight determining means for determining a vehicle weight based on the integrated acceleration value and the integrated driving force value.

According to a further aspect of the invention, the vehicle weight determination device for a vehicle having a torque transmitting device for transmitting an output torque of an engine to a drive wheel through torque converter. The vehicle weight determination device includes an acceleration detecting means for detecting acceleration of the vehicle; a driving force determining means for determining vehicle driving force; a speed ratio detecting means for detecting a speed ratio of the torque converter; a vehicle starting condition judging means for judging a vehicle starting condition based on one condition that the detected speed ratio is equal to or more than a predetermined value; an acceleration integrating means for integrating a value corresponding to the detected acceleration value when the vehicle starting condition judging means judges the vehicle being under the starting condition for a predetermined period of time from the initiation of the integration to the end of the integration to obtain an integrated acceleration value; a driving force integrating means for integrating a value corresponding to the determined driving force for the predetermined period of time to obtain an integrated driving force value; and a vehicle weight determining means for determining a vehicle weight based on the integrated acceleration value and the integrated driving force value.

According to a still further aspect of the invention, the vehicle weight determination device for a vehicle having a torque transmitting device for transmitting an output torque of an engine to a drive wheel through torque converter. The vehicle weight determination device includes an acceleration detecting means for detecting acceleration of the vehicle; a driving force determining means for determining a vehicle driving force; an acceleration obtaining means for obtaining an acceleration after filtering by removing low frequency component included in the detected acceleration by the acceleration detecting means; a driving force obtaining means for obtaining a driving force after filtering by removing a low frequency component included in the determined driving force determined by the driving force determining means; an integration initiating timing judging means for judging whether the vehicle is under a vehicle starting condition, judging whether the acceleration after filtering is substantially equal to a value of the driving force after filtering divided by a predetermined standard vehicle weight and determining an integration initiating timing when the vehicle is judged to be under the starting condition and when the acceleration after filtering is judged to be substantially equal to the value of the driving force after filtering divided by the predetermined standard vehicle weight; an acceleration integrating means for integrating a value corresponding to the acceleration value for a predetermined period of time from the initiating timing of the integration to obtain an integrated acceleration value; a driving force integrating means for integrating a value corresponding to the driving force after filtering for the predetermined period of time to obtain an integrated driving force value; and a vehicle weight determining means for determining a vehicle weight based on the integrated acceleration value and the integrated driving force value.

According to another aspect of the invention, the vehicle weight determination device for a vehicle having a torque transmitting device for transmitting an output torque of an engine to a drive wheel through torque converter. The vehicle weight determination device includes an acceleration detecting means for detecting acceleration of the vehicle; a speed ratio detecting means for detecting a speed ratio of the torque converter; a driving force determining means for determining vehicle driving force; a vehicle starting condition judging means for judging a vehicle starting condition; an integration initiating timing judging means for judging an integration initiating timing based on the vehicle being under a vehicle starting condition; a speed ratio peak judging means for judging whether the detected speed ratio indicates a peak value under the vehicle starting condition; an integration end timing determining means for determining an integration end timing when the detected speed ratio indicates the peak value; an acceleration integrating means for integrating a value corresponding to the detected acceleration value for a predetermined period of time from the integration initiating timing to the integration end timing to obtain an integrated acceleration value; a driving force integrating means for integrating a value corresponding to the determined driving force for the predetermined period of time to obtain an integrated driving force value; and a vehicle weight determining means for determining a vehicle weight based on the integrated acceleration value and the integrated driving force value.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which;

FIG. 5(A) is a graph showing a value of a driving force after filtering divided by a known vehicle weight and an acceleration value after filtering under the vehicle starting condition when a large change of the acceleration appears due to torsion of a vehicle drive train and FIG. 5(B) is a graph showing an absolute value change of the value shown in FIG. 5(A);

FIG. 8(A) is a graph showing acceleration and driving force from the vehicle started to, initiation of a speed change operation and FIG. 8(B) is a graph showing a speed ratio from the vehicle started to initiation of a speed change operation;

DETAILED DESCRIPTION OF THE PRESENT INVENTION

Figure 1:
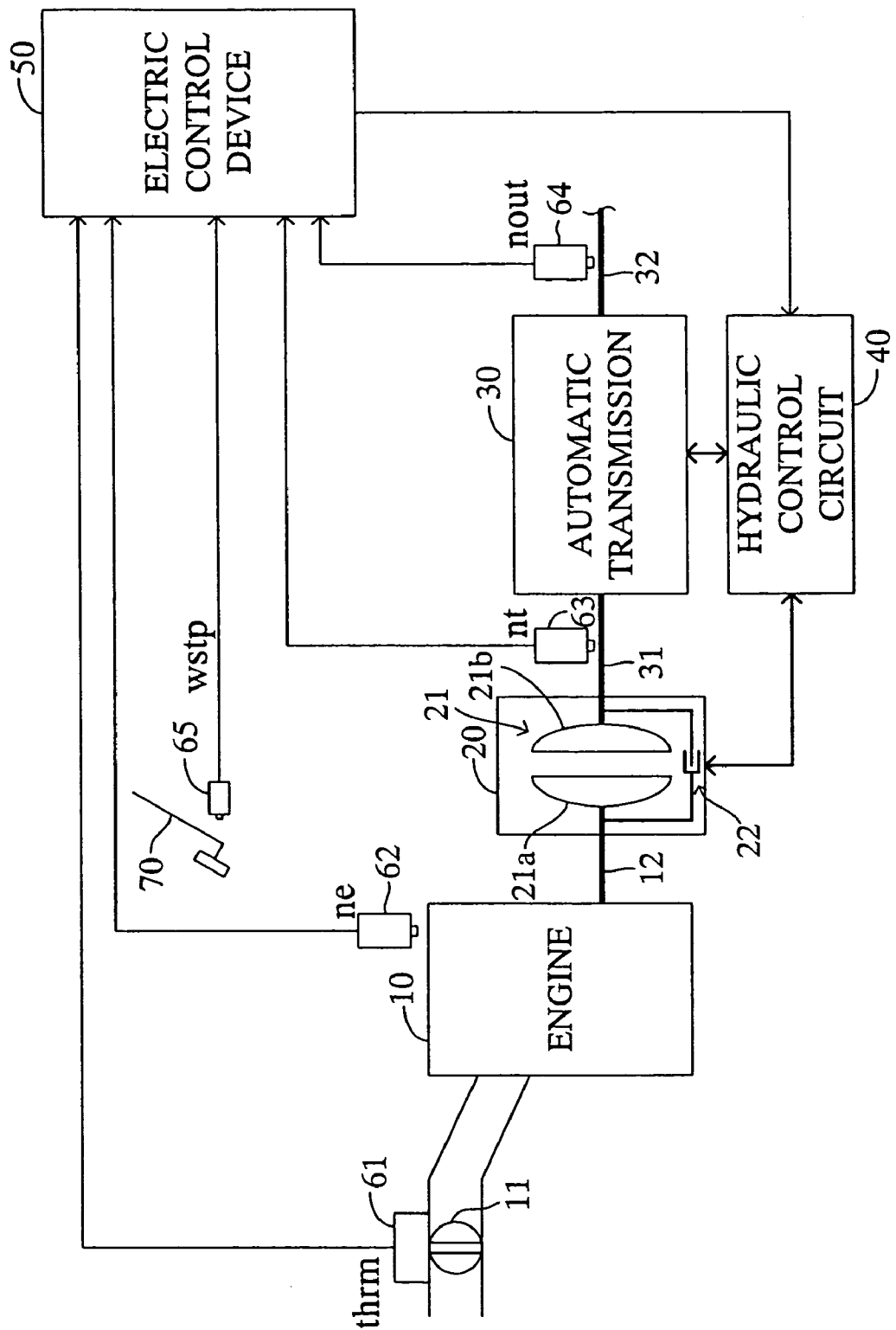
FIG. 1 is a system in which a speed change control device including a vehicle weight determination device according to the present invention is installed in a vehicle.

As shown in FIG. 1, a vehicle includes an engine 10, a hydraulic torque converter with lock-up clutch 20 an automatic transmission 30 having two sets of or three sets of planetary gear unit for speed gear shifting (four forward and one reverse stages), a hydraulic control circuit 40 for controlling hydraulic pressure supplied to the torque converter 20 and the automatic transmission 30, and an electric control device 50 for outputting control signals to the hydraulic control circuit 40. The output torque from the engine 10 is controlled by an acceleration pedal (not shown) for transmitting the torque to the drive wheels (not shown) via the torque converter 20, automatic transmission 30 and a differential gear unit (not shown).

The torque converter with lock-up clutch 20 is comprised of a hydraulic transmitting mechanism 21 for transmitting driving force generated by the engine 10 to the automatic transmission 30 by operation fluid and a lock-up clutch mechanism 22 connected to the hydraulic transmitting mechanism 21 in parallel therewith.

The hydraulic transmitting mechanism 21 includes a pump impeller 21a connected to an input shaft 12 of the torque converter. The input shaft 12 is rotated together with a crank shaft (not shown) of the engine 10. The transmitting mechanism 21 further includes a turbine impeller 21b connected to an input shaft 31 of the automatic transmission 30 and rotated by the flow of operation fluid generated by the pump impeller 21a and a stator impeller (not shown). The lock-up clutch mechanism 22 includes a lock-up clutch for mechanically connecting the input shaft 12 of the torque converter 20 and the input shaft 31 of the automatic transmission 30 by the lock-up clutch and by the supply and discharge of the operation fluid by the hydraulic control circuit 40 connected thereto. The lock-up clutch mechanism 22 either connects the input shaft 12 of the torque converter 20 and the input shaft 31 of the automatic transmission 30 for unitary rotation or disconnects them for non-transmitting of the torque generated by the engine 10 to the automatic transmission 30.

The automatic transmission 30 is provided with the input shaft 31 and output shaft 32 connected to the vehicle drive wheel(s) via the differential gear unit for selectively establishing one of the plurality of speed change stages (four forward speed change stages and one reverse speed change stage) by the combination of plurality of hydraulic friction engaging elements of the hydraulic friction engagement device in response to the supply and discharge of the operation fluid by the hydraulic control circuit 40. A well-known planetary gear set constructs the automatic transmission 30 for unitary rotating the input and output shafts 31, 32 through the selected speed gear. In this automatic transmission 30, the drive force is transmitted from the drive wheel side to the engine 10 for driving the engine (engine brake condition) at the two forward speed change stages ($3^{rd}$ and $4^{th}$). On the other hand, at the $1^{st}$ and $2^{nd}$ speed change stages, such reverse drive force transmission is restricted by operating one-way clutch (not shown), but can be achieved by engaging the friction elements to release the one-way clutch.

The hydraulic control circuit 40 includes a plurality of solenoid valves (not shown), which are ON-OFF controlled by a signal from the electric control device 50. The supply and discharge control of the operation fluid for the lock-up clutch mechanism 22 and the automatic transmission 30 is achieved by the combination of operation of the solenoid valves.

The electric control device 50 includes a microcomputer including CPU, memory circuits (ROM, RAM) and interface (these components are well known type and are not shown) and is connected to a throttle opening degree sensor 61, an engine rpm sensor 62, a turbine rotational speed sensor 63, an output shaft rotational speed sensor 64 and a brake switch 65 for respectively receiving signals from these sensors and switch.

The throttle opening degree sensor 61 detects the opening degree of a throttle valve 11 which opens and closes in accordance with the operation of the acceleration pedal and inputs a throttle opening degree signal thrm. The engine rpm sensor 62 detects the engine rpm and inputs an engine rpm signal ne. The turbine rotational speed sensor 63 detects the rotational speed of the input shaft 31 of the automatic transmission 30 (which corresponds to turbine rotational speed) and inputs a turbine rotational speed signal nt. The output shaft rotational speed sensor 64 detects the rotational speed of the output shaft 32 of the automatic transmission 30 (which is proportional to the vehicle speed) nout. The brake switch 65 detects a brake pedal operation condition and inputs a brake operation signal wstp. The brake operation signal wstp, includes a high level signal "1" in response to the brake pedal operation and a low level signal "0" in response to the non-brake pedal operation.

Figure 2A:
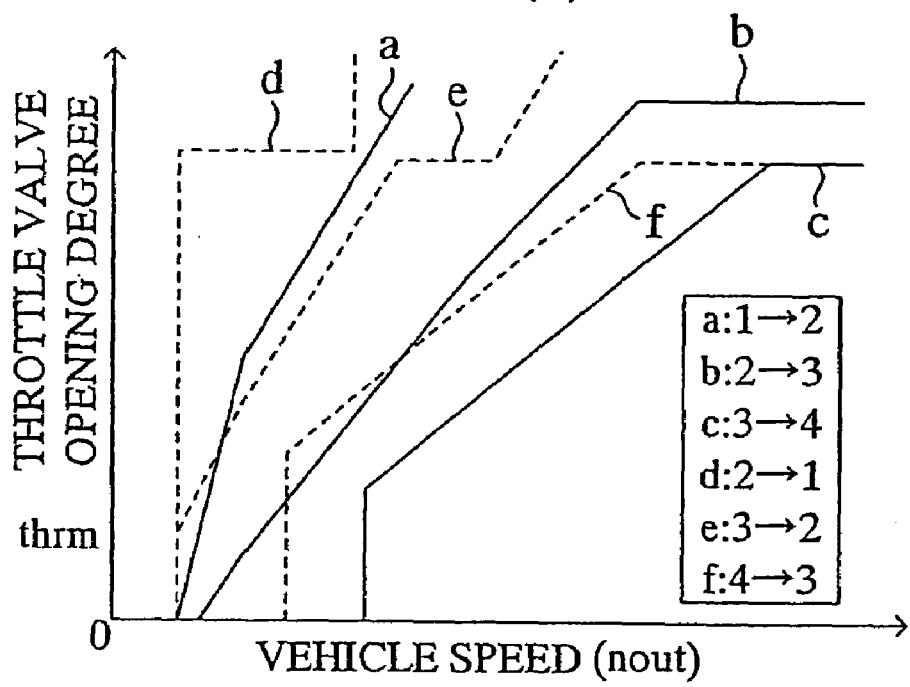
FIGS. 2(A) and (B) each shows a speed change characteristic used for speed change controlling by an electric control device of FIG. 1.

Now explaining the control of the lock-up clutch and automatic transmission 30, the electric control device 50 memorizes the output shaft operational speed (vehicle speed) nout and throttle opening degree thrm in the memory as a speed change map shown in FIG. 2(A). As shown in FIG. 2(A), when a speed change performance line passes a point determined by the output shaft rotational speed nout and the throttle valve opening degree thrm, the hydraulic control circuit 40 operates the solenoid valves to achieve the speed change operation according to the speed change performance line.

Figure 3:
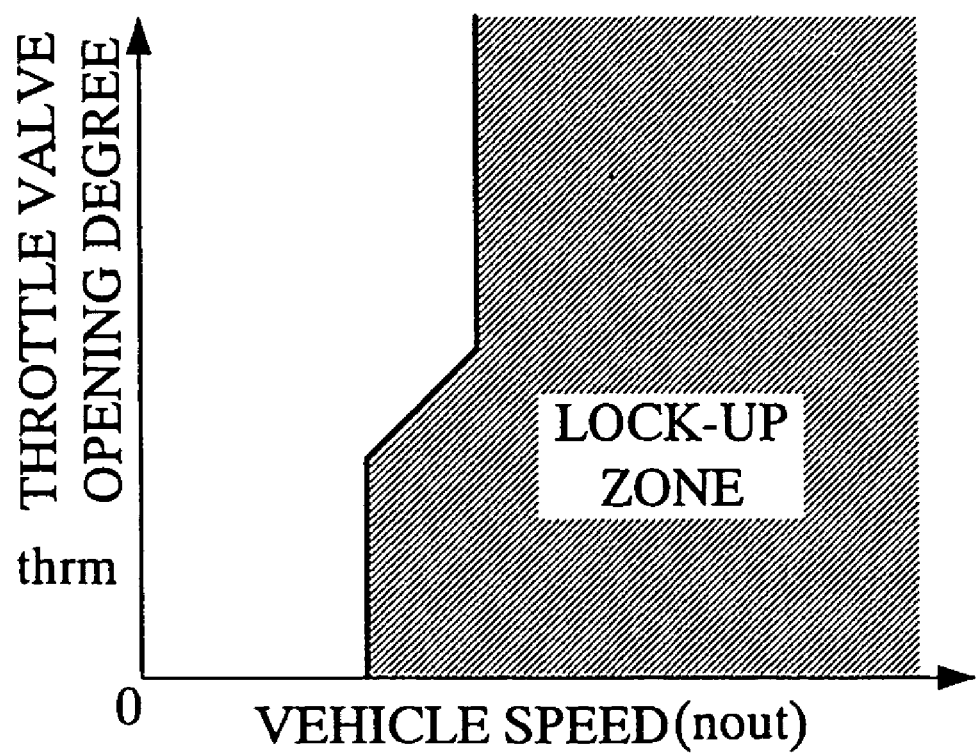
FIG. 3 is a map used for lock-up control of the electric control device of FIG. 1.

Similarly, the electric control device 50 memorizes the output shaft operational speed (vehicle speed) nout and throttle opening degree thrm in the memory as a lock-up clutch operation map shown in FIG. 3. As shown in FIG. 3, when the output shaft rotational speed nout and the throttle valve opening degree thrm are positioned in the look-up area (hatched area in the drawing), the hydraulic control circuit 40 operates the solenoid valves to engage the lock-up clutch mechanism 22.

Figure 2B:
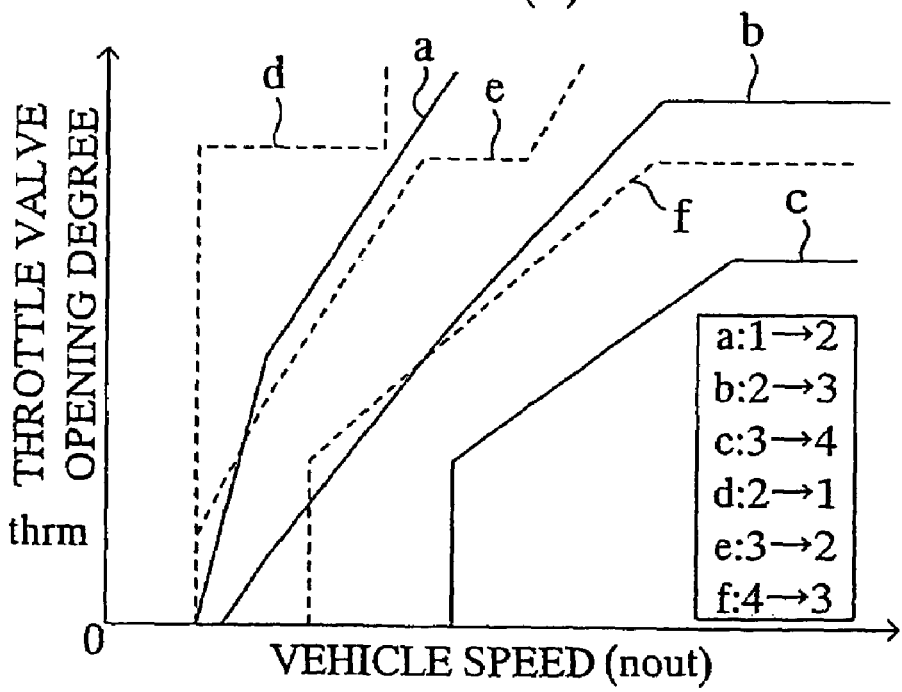

Further, the electric control device 50 presumes pr determines the vehicle weight, which is variable in accordance with the number of passenger and the loan carried by the vehicle. In more detail, when the vehicle weight m is equal to or more than a predetermined value mth, the electric control device 50 changes the speed change map shown in FIG. 2(A) to the map shown in FIG. 2(B) for expanding the low speed change area and disengages the one-way clutch at the $1^{st}$ and $2^{nd}$ speed change stages for effecting the engine brake operation. This speed change control is achieved by execution of the speed change program by the microcomputer in the electric control device 50.

(Basic Theory of Vehicle Weight Determination)

Now explaining about the vehicle weight determination method executed by the electric control device 50, the vehicle equation of motion is shown as follow:

$$m \cdot dv = F - m \cdot g \cdot \sin\theta - R \qquad 1$$

Wherein, m represents vehicle weight, dv represents acceleration, F represents driving force from engine, θ represents road inclination angle, g represents gravity and R represents vehicle running resistance.

The acceleration dv is the value of differential of vehicle speed and accordingly, the value dv can be obtained by differentiating the output shaft rotational speed nout corresponding to the vehicle speed. An acceleration sensor installed in the vehicle also obtains the acceleration dv.

The driving force F in the equation 1 above is a driving force from the engine 10 via torque converter 20 and the automatic transmission 30 and when the lock-up clutch is engaged, the output torque t0 of the engine 10 can be presumed or determined based on the engine load (throttle valve opening degree thrm) and engine rpm ne. The driving force F is obtained by multiplying the presumed output torque to by various constants such as gear ratio k1 of the selected speed change, gear efficiency k2 of the same speed change and gear efficiency k3 of the differential gear unit.

In this case, when the engine 10 is running regularly (normal driving condition), the output torque t0 is relatively accurately obtained by the values of the throttle opening degree thrm and engine rpm ne. However, normally the engine is operated under a transitional condition such as starting of the vehicle and it is difficult to obtain an accurate output torque of the engine based on the throttle opening degree and the engine rpm.

When the lock-up clutch is not engaged, in other words, when the torque is being transmitted by the hydraulic transmitting mechanism 21, a torque converter output torque T corresponding to the engine torque t0 can be obtained from the following equation 2:

$$T = \lambda \cdot Cp \cdot ne^2 \qquad 2$$

Wherein λ represents torque amplification ratio of the hydraulic transmitting mechanism 21 of the torque converter 20, Cp represents capacity factor of the transmitting mechanism 21. The torque amplification ratio λ and the capacity factor Cp are respectively the functions of speed ratio e (e=nt/ne). Accordingly the value of λ·Cp relative to the speed ratio e can be obtained in advance and memorized as a map (λ·Cp map). Then the value of λ·Cp can be immediately obtained from the actual speed ratio e and the λ·Cp map. Thus the value of λ·Cp can be more accurately obtained compared to the value λ·Cp obtained by the value of λ and Cp from the actual speed ratio separately.

The above equation 2 can be established regardless of the engine 10 running condition and the output torque T of the torque converter 20 can be obtained accurately without being influenced by the engine condition.

The driving force F in the previous equation 1 can be obtained using the output torque T of the torque converter 20, which is shown as the following equation 3:

$$F = k \cdot \lambda \cdot Cp \cdot ne^2 \qquad 3$$

Wherein the constant k represents the multiplication of gear ratio k1 of the selected speed change, gear efficiency k2 of the same speed change, gear efficiency k3 of the differential gear unit and correction coefficient k4.

Referring now to the inclination of the road, which is necessary for determining the vehicle weight m, when the vehicle is running on a constant inclination road, the value θ is constant and accordingly, the value of m·g·sin θ is constant and appears as direct current component in acceleration dv. However, the road inclination θ is relatively gradually changing and influence of the inclination θ appears as a low frequency component less than or equal to 2 Hz in the acceleration dv. The acceleration dv also includes direct current component by the driving force F. Therefore, if a low frequency signal (appropriate frequency less than or equal to 2 Hz) is removed from the signals of the acceleration dv and the driving force F, the equation of motion removing the road inclination influence can be obtained as following equation 4:

$$hf = m \cdot hdv \qquad 4$$

Wherein, hf represents driving force after filtering by removing a frequency component which is equal to or less than a predetermined value, such as 2 Hz from the driving force F, and hdv represents the acceleration after filtering by removing the frequency component which is equal to or less than the predetermined value, such as 2 Hz from the acceleration dv. The equation 1 includes vehicle running resistance R, but such running resistance R includes only the low frequency component and since such low frequency component has been removed in the equation 4, the vehicle running resistance R does not appear in the equation 4.

(Introduction of Area Method)

As shown in the equation 4, the vehicle weight m is obtained by dividing the driving force after filtering hf by the acceleration after filtering hdv. This means when the value of acceleration after filtering hdv is small, noise included in the acceleration after filtering hdv affects against the accuracy of determining the vehicle weight m, and therefore it is desirable to reduce the noise in the acceleration after filtering hdv. In order to remove such noise as much as possible, the vehicle weight m is (1) determined when the value of hdv becomes large, and (2) determined by using an integrated acceleration value hdv which is equal to an average value for a period of time in the acceleration after filtering hdv and an integrated value of the driving force after filtering hf of the same period of time. The equation 4 can be replaced with the following equation 5.

$$\int hf \, dt = m \cdot \int hdv \, dt \text{ (integration: } t1 \text{ to } t2\text{)} \qquad 5$$

Vehicle starting time is defined as the integration period (t1 to t2) to improve the accuracy of the determination of the vehicle weight m.

Figure 4:
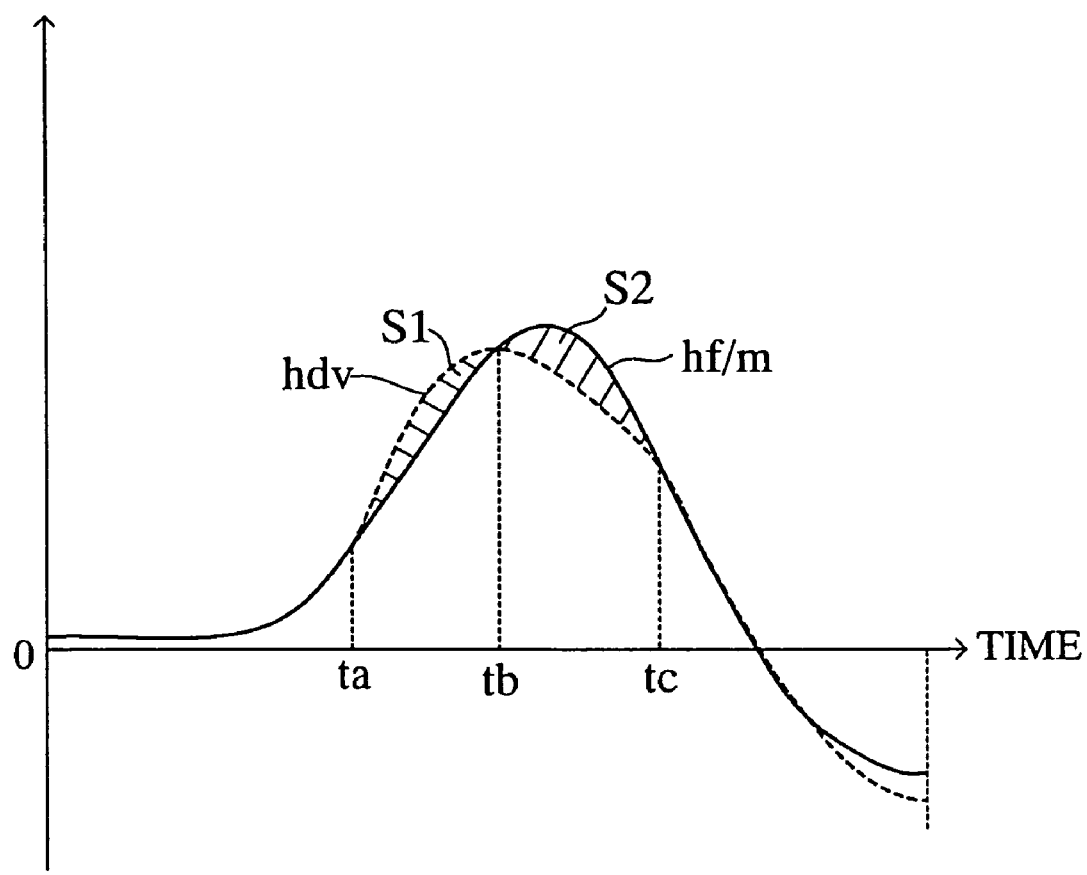
FIG. 4 is a graph showing a value of a driving force after filtering divided by a known vehicle weight and an acceleration value after filtering under the vehicle starting condition.

FIG. 4 is a graph showing a value of a driving force after filtering hf divided by a known vehicle weight (hf/m) and an acceleration value after filtering hdv under the vehicle starting condition in which changes of the acceleration dv due to torsion in the vehicle drive train may seldom occur. The solid line in FIG. 4 indicates hf/m and dotted line indicates hdv. The integrated value Sf(=∫(hf/m) dt) is illustrated by the area enclosed by the line hf/m and the horizontal axis x and the integrated value Sdv (=∫hdv dt) is illustrated by the area enclosed by the line hdf and the horizontal axis x.

This method using the area for obtaining the vehicle weight m is mentioned as "Area Method".

Further, as shown in FIG. 4, a phase difference exists between the value hf/m (driving force after filtering hf divided by vehicle weight m) and the value hdv (acceleration after filtering hdv). The value hdv is greater than the value hf/m between the time ta and the time tb and is smaller between the time tb and the time tc. According to the area method, since the area S1 enclosed by the lines hdv and hf/m between the time ta and tb is approximately equal to the area S2 enclosed by the lines hdv and hf/m between the time tb and tc, such phase difference can be absorbed to improve the accuracy of determination of the vehicle weight m.

(Integration of Absolute Value)

As is clear from the equation 5, the vehicle weight m is obtained by the integrated value Sf (=∫hf dt) divided by Sdv (=∫hdv dt). Accordingly the vehicle weight is accurately determined by the larger value of Sdv with smaller noise component. It is necessary to extend the integration period for the acceleration after filtering hdv to increasing the value Sdv (integrated value of acceleration after filtering hdv).

However, the values of the acceleration after filtering hdv and the driving force after filtering hf at the vehicle starting are positive (+) between the time td and te, but become negative (−) after the time te as shown in FIG. 5 in which relatively large acceleration change is generated due to the torsion of the drive train of the vehicle. If the integration period is extended to the time tf, the values of positive and negative are cancelled each other to reduce both values Sf and Sdv. It is accordingly not a desirable solution to merely extend the integration period.

With this regard, the applicants of this invention proposed to use the absolute value in the equation 4. The following equations 6 and 7 are shown:

$$|hf| = m \cdot |hdv| \qquad 6$$

$$\int |hf| dt = m \cdot \int |hdv| dt \text{(integration: } t1 \text{ to } t2\text{)} \qquad 7$$

According to these equations, as shown in FIG. 5(B), the areas obtained by the integration become always positive regardless of the code (indicating positive and negative value) of hdv and hf. Thus the integrated values do not become small even if the integration period is extended.

(Introduction of Forgetting Factor)

The acceleration after filtering hdv is a signal in which a low frequency component caused by road inclination θ from the acceleration dv is removed by high-pass filter, a vibration component caused by torsion of drive train and suspension system is removed by notch filter (later described) and a sensor noise is removed by low-pass filter.

The acceleration after filtering hdv greatly changes immediately after the vehicle starts as shown in FIG. 5. This is because the filtering process by the notch filter is under way. If the acceleration after filtering hdv is integrated under such condition that the noise caused by the vibration or torsion from the drive train remains in the acceleration after filtering hdv, the accurate determination of the vehicle weight may not be obtained.

We therefore, introduced a forgetting factor Λ for integrating the acceleration after filtering hdv and driving force after filtering hf, which will be shown as the following equation 8:

$$\int \Lambda^{(t2-t)} |hf| dt = m \cdot \int \Lambda^{(t2-t)} |hdv| dt \text{ (integration: } t1 \text{ to } t2\text{)} \qquad 8$$

The forgetting factor Λ is a coefficient defined by numeral between 0 and 1 (for example, 0.98).

According to the equation 8, the integrated driving force is obtained by integrating multiplication of the absolute value of driving force after filtering (hf) and the forgetting factor (Λ) which value becomes larger in accordance with the lapse of time from the integration start. Further, the integrated acceleration is obtained by integrating multiplication of the absolute value of acceleration after filtering (hdv) and the forgetting factor (Λ) which value becomes larger in accordance with the lapse of time from the integration start. The vehicle weight (m) is obtained (presumed) by dividing the value of the integrated driving force by the value of the integrated acceleration.

Figure 6:
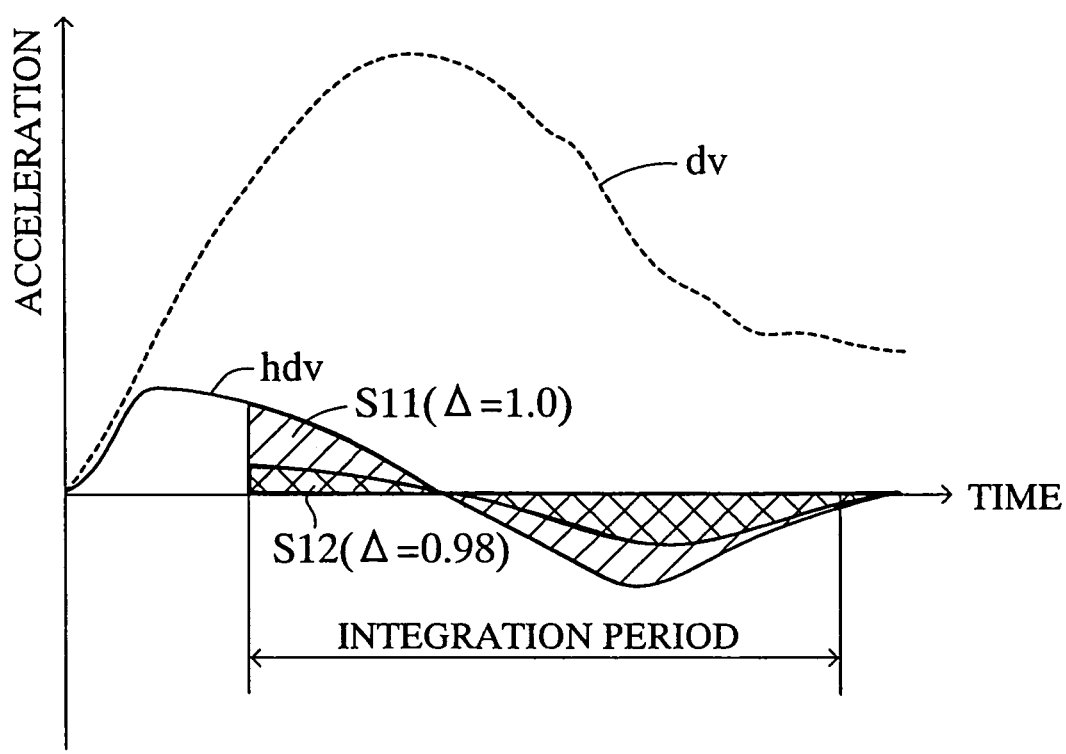
FIG. 6 is a graph showing integration result of acceleration after filtering with different forgetting factors specified by hatched area.

FIG. 6 shows the integrated value ($\int \Lambda^{(t2-t)} |hdv| dt$) shown in the equation 8 above as the areas S11 and S12. The area S11 represents the case that the forgetting factor Λ is "1" (the factor is not applied) and the area S12 represents the case that the forgetting factor Λ is applied (for example: Λ=0.98). As clearly indicated by the areas S11, S12 of FIG. 6, the acceleration after filtering hdv and the driving force after filtering hf having potential errors immediately after the vehicle start have been refined and the vehicle weight m can be accurately determined by integration using the forgetting factor. In the equation 8, the value indicated as $\int \Lambda^{(t2-t)} |hf| dt$ is referred to as integrated driving force SF and the value ($\int \Lambda^{(t2-t)} |hdv| dt$) is referred to as the integrated acceleration Sa.

(Correction of Integration Initiating Timing by Speed Ratio)

As noted above, it is preferable to determine the vehicle weight m at the time the acceleration after filtering (hdv) becomes large such as at vehicle starting. In addition, the speed ratio (e) of the torte converter is obtained by the turbine rotational speed (nt) divided by the engine rpm (ne) and is considered as the value, which is least affected by noise. Such speed ratio e is preferably used for judging the vehicle start condition to improve the accuracy of the vehicle weight determination.

In more detail, the vehicle start condition is presumed when the throttle valve opening is greater than "0" (thrm>0), the brake pedal is not operated (wstp=0), and the vehicle speed is greater than 0 and the speed ratio e is greater than a predetermined value (for example, e>0.1). Under such condition, the integration is initiated presuming that the vehicle is about to start.

(Determination of Vehicle Weight by Delaying the Integration Initiation)

Figure 7:
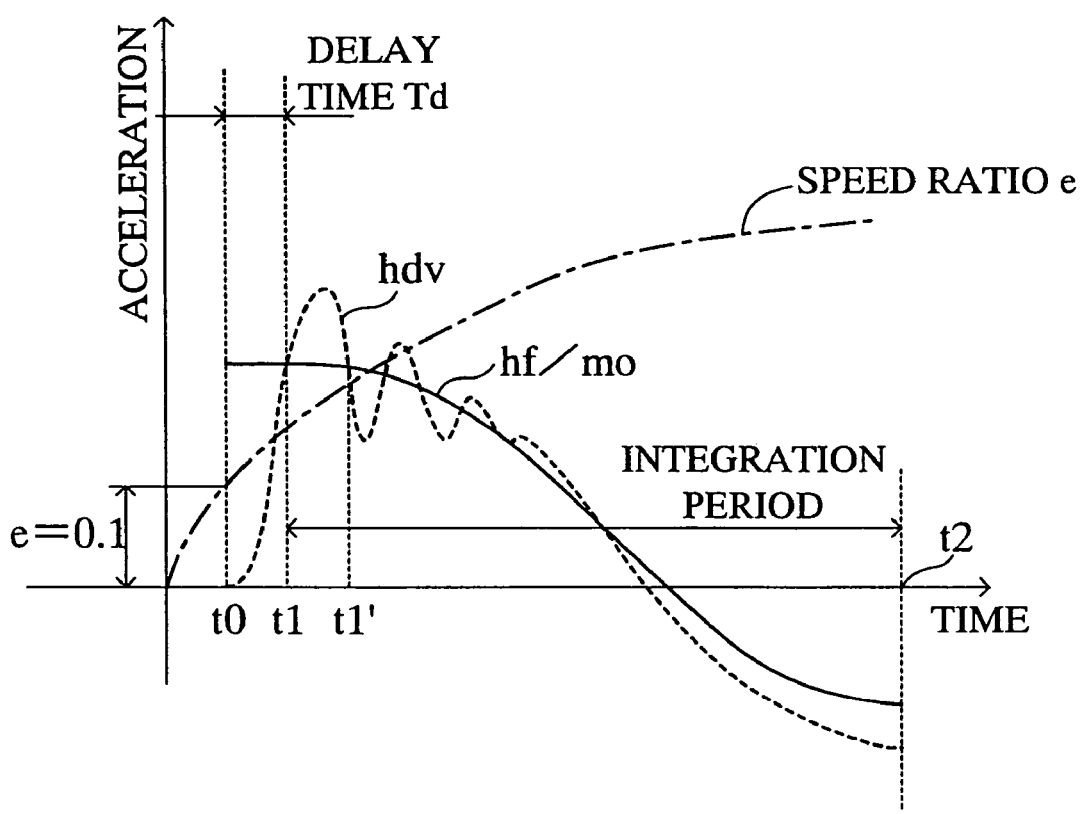
FIG. 7 is a graph showing a value of acceleration after filtering and a value of driving force after filtering divided by a standard vehicle weight and a speed ratio under the vehicle starting condition.
Figure 9:
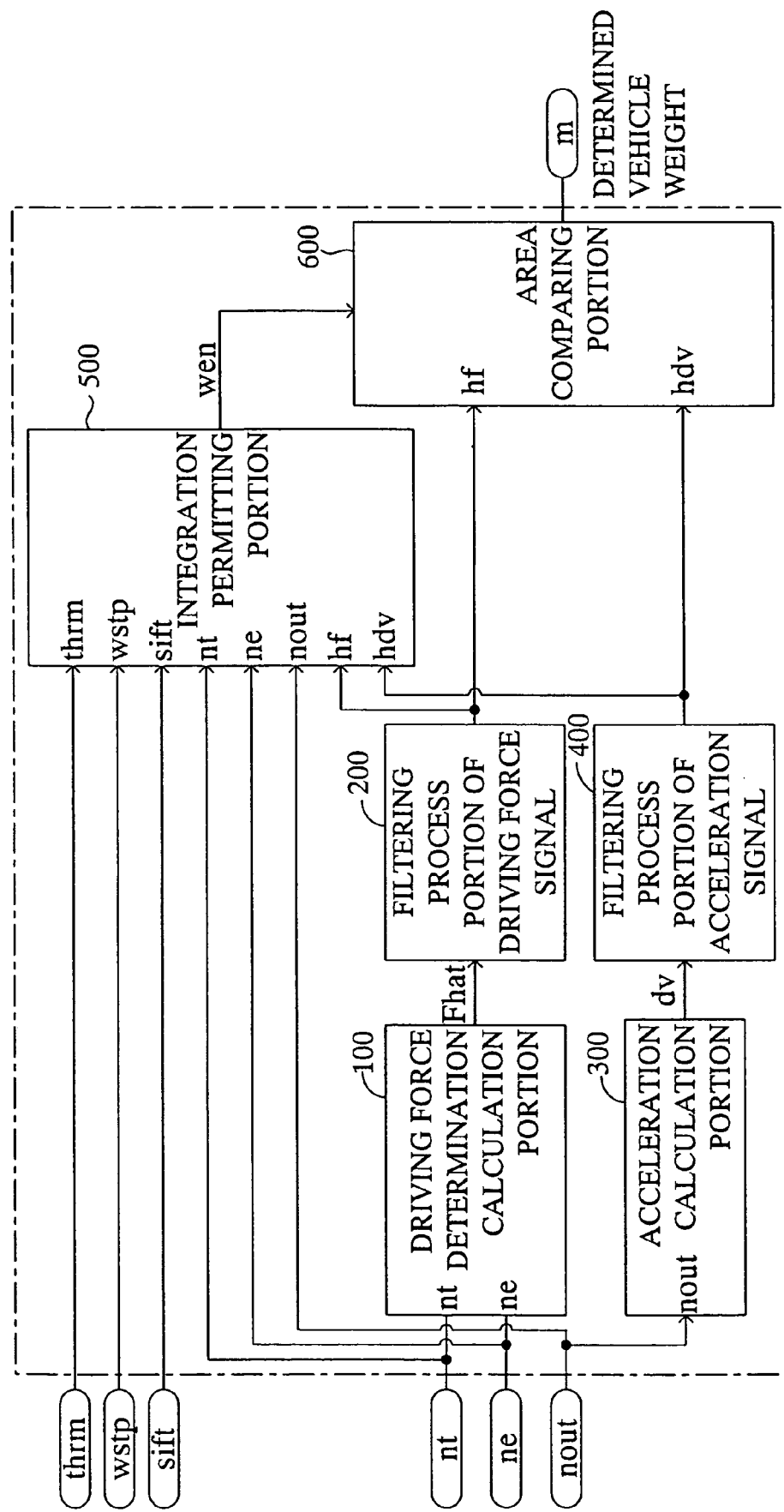
FIG. 9 is a functional block of the entire program for executing a vehicle weight determination by a computer of the electric control device of FIG. 1.

FIG. 7 is a graph showing a value of acceleration after filtering (hdv), a value of a driving force after filtering (hf) divided by a standard vehicle weight (m0) and a speed ratio (e) under the vehicle starting condition, each showing dotted line, solid line and a chain line. The standard vehicle weight m0 is defined that the vehicle loaded by a half of the maximum allowable cargo of the vehicle (half loaded condition).

If the vibration is not appearing in the acceleration after filtering (hdv) in duplicate, the value hdv has to be changed according to the value (hf/m0) of the driving force after filtering (hf) divided by the standard vehicle weight (m0). As described., the vehicle weight m has to be accurately and reliably determined by initiating the integration using the speed ratio e for determining the vehicle starting condition.

The acceleration after filtering hdv is largely changed immediately after the judgment of the vehicle start using speed ratio e (after time t0 and t1) under a vehicle model or a type or a vehicle driving condition that the vehicle acceleration dv may largely receive influence by the torsion from the vehicle drive train.

Accordingly, the execution of integration is delayed in this embodiment of the invention considering such influence at the time of vehicle start until the value of the acceleration after filtering hdv agrees to the value (hf/m0) of the driving force after filtering (hf) divided by the vehicle standard weight (m0). In FIG. 7, the time t1 is such timing of agreement of values hdv and hf/m0.

The acceleration after filtering hdv is not used until the time t1 to further improve the determination of vehicle weight.

The standard vehicle weight m0 has been defined as the half load condition, but it is applicable to any value as far as such value is more than 0 (no loaded condition) and equal to or less than the maximum allowable load of the vehicle. The integration may be further delayed if sufficient integrated acceleration value is available in conjunction with the integration end timing (t2). In this case, the integration initiating time can be defined at the timing when the value (hdv) line passes the value (hf/m0) line downward at the time t1 ' after the value (hdv) line (acceleration after filtering) passes the value (hf/m0) line upward at the time t1 . In other words, the integration begins only after the time t1 when the value hdv reaches the value hf/m0 , which improves the accuracy of determination of the vehicle weight.

(Appropriate Integration End Timing Using Speed Ratio)

As explained, longer the integration period, larger the integrated acceleration value Sa becomes to improve the accuracy of determination of the vehicle weight m. On the other hand, when the vehicle automatic transmission initiates the speed change operation from first speed to second speed after the vehicle starts, the torque transmission may not accurately be presumed and accordingly the accurate driving force F may not be obtained by simply calculating the speed ratio e. It is therefore preferable to terminate the execution of the integration of the acceleration after filtering and the driving force after filtering based on a proper judgment of the starting time of speed change operation.

In this embodiment, considering the fact that the speed ratio e increases gradually after the vehicle starts and reaches the peak (maximum value) before it changes largely after beginning of speed change operation from $1^{st}$ to $2^{nd}$, the integration end timing t2 is defined at the time the peak value of the speed ratio e is detected. In more detail, the peak value of the speed ratio e is judged and the integration terminates when the value of speed ratio e exceeds a predetermined value (for example, 0.88), and indicates the decrease tendency consecutively twice by sampling the timing.

FIG. 8(A) is a graph showing the time change of the acceleration dv and driving force F at the vehicle starting and FIG. 8(B) is a graph showing the changing condition of the speed ratio e at the same timing with FIG. 8(A). If the integration of the acceleration after filtering hdv and the driving force after filtering hf ends at the time tp indicating the speed ratio being maximum (peak point) in FIG. 8(B), the determination of the vehicle weight m can be improved by removing potential noise generated after the time tp.

(Actual Operation)

Referring now to the actual determination of the vehicle weight m by the electric control device 50 with reference to FIGS. 9 to 17, FIGS. 9 to 17 respectively show the functional block of programs to be executed by the microcomputer in the electric control device 50. These programs are stored in ROM. The symbols thrm, wstp, nt, and nout indicate respectively the signals from sensors and switch 61 to 65 and symbol "sift" indicates the actual speed change stage of the automatic transmission 30 acknowledged by the microcomputer by the execution of the speed change control program and hereinafter called as speed change stage signal "sift".

(Overall Program Structure)

Microcomputer includes a driving force determination calculation portion 100 for obtaining the a driving force determination signal Fhat by the turbine rotational speed nt and the engine rpm ne, a filtering process portion of driving force signal 200 for obtaining the driving force after filtering hf by filtering the driving force determination signal Fhat, an acceleration calculation portion 300 for obtaining the acceleration signal dv from the output shaft rotational speed nout, a filtering process portion 400 of the acceleration signal for obtaining the acceleration after filtering hdv by filtering the acceleration signal dv, an integration permitting portion 500 for deciding the integration period (initiation timing t1 and end timing t2), and an area comparing portion 600 for determining the vehicle weight m according to the equation 8.

(Driving Force Determination Calculation Portion)

Figure 10:
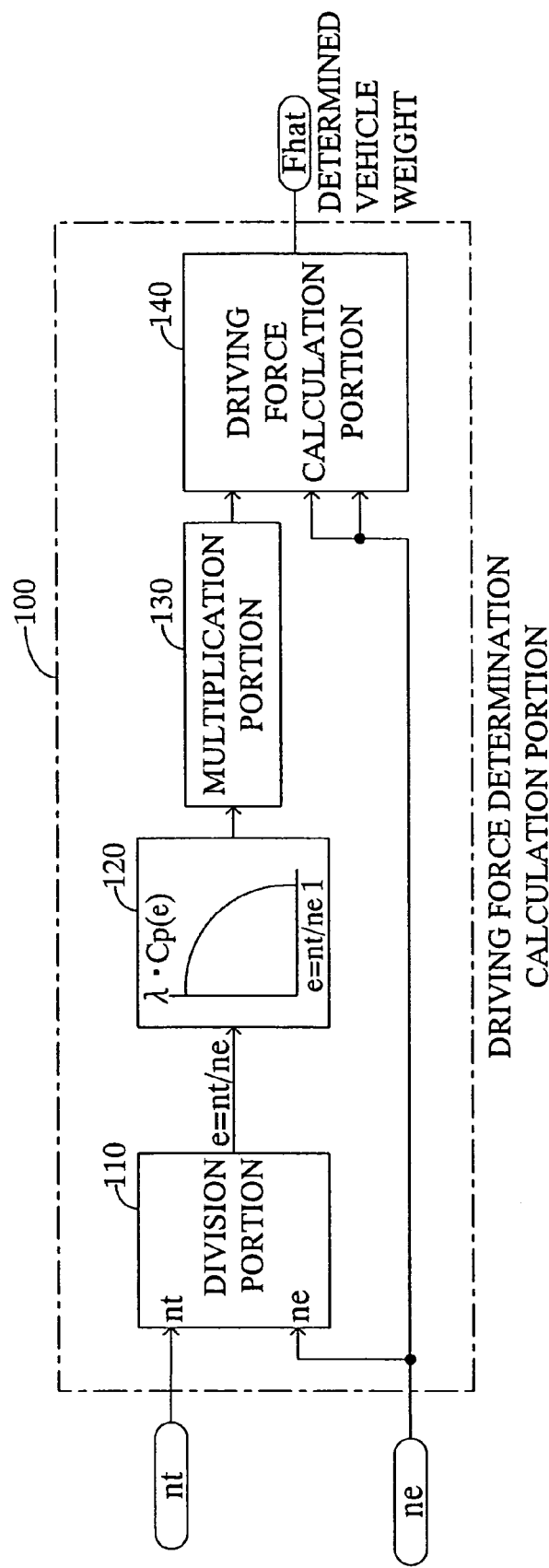
FIG. 10 is a functional block showing the detail of the program at calculation part of the driving force determination shown in FIG. 9.
Figure 11:
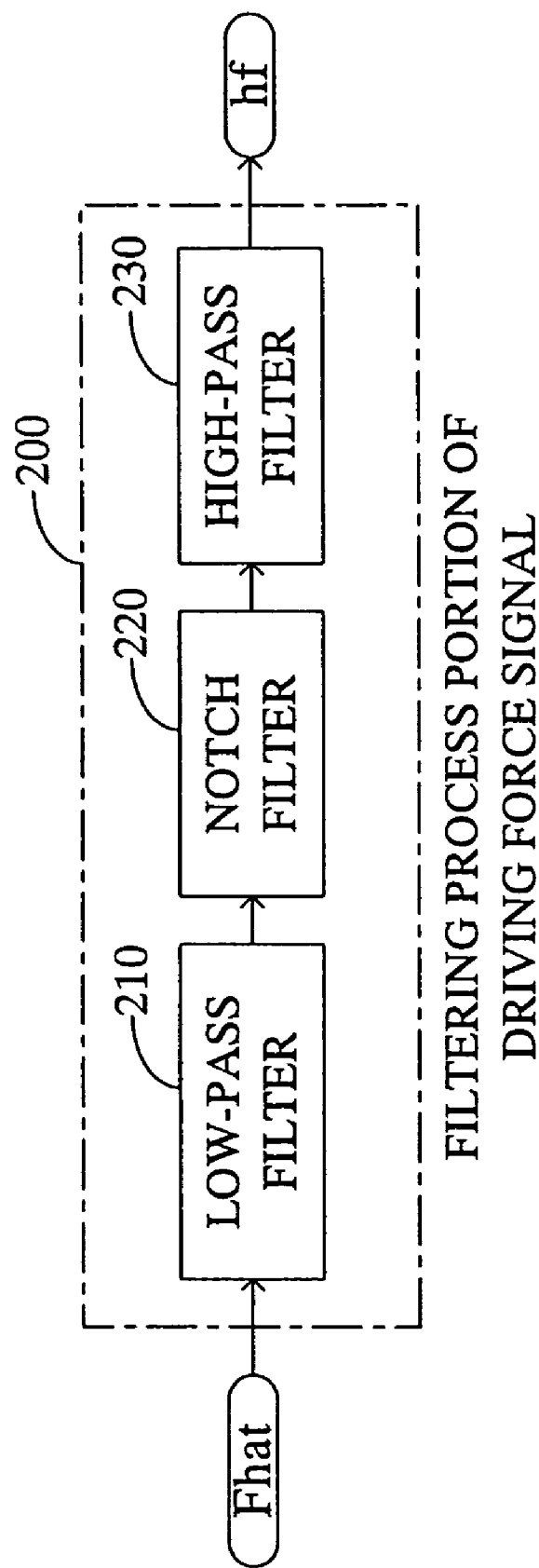
FIG. 11 is a functional block showing the detail of the program at filtering process part of the driving force determination signal shown in FIG. 9.

The microcomputer executes the program in the driving force determination calculation portion 100 shown in detail in FIG. 10 every predetermined time ts (for example 20 msec) to obtain the driving force determination signal Fhat. In more detail, microcomputer receives turbine rotational speed and engine rpm signals nt and ne at a division portion 110 and the division portion 110 divides the value nt by the value ne to obtain the speed ratio e (=nt/ne).

The microcomputer calculates actual multiplication value $\lambda \cdot Cp$ (e) in a block 120 based on the "$\lambda \cdot Cp$ map" illustrating the relation between the speed ratio e and the multiplication value $\lambda \cdot Cp$ and the actual speed ratio e obtained at the division portion 110. The $\lambda \cdot Cp$ map used in the block 120 is prepared in advance by an experiment work and stored in the ROM of the electric control device 50. The $\lambda \cdot Cp$ map is prepared by fixing the speed change stage of the automatic transmission 30 at the first speed range, driving the vehicle with various load conditions by changing the load of the vehicle, and obtaining by measuring the actual multiplication value $\lambda \cdot Cp$ relative to the actual speed ratio e. The actual multiplication value $\lambda \cdot Cp$ is obtained based on the actual output torque T0 of the engine 10 (measured by a torque sensor) and the actual engine rpm ne (measured by the engine rpm sensor) and the equation 2.

The microcomputer then obtains the value $k \cdot \lambda \cdot Cp$ at a multiplication portion 130 by multiplying the multiplication value $\lambda \cdot Cp$ obtained at the block 120 by the constant k as indicated in the equation 3. The constant k is the value of first gear ratio k1, gear efficiency of the same first gear, gear efficiency k3 of the differential gear multiplied by a predetermined constant k4. The microcomputer then calculates the driving force F $(=k \cdot \lambda \cdot Cp \cdot ne^2)$ at a driving force calculation portion 140 and outputs the driving force determination signal Fhat as the driving force F.

(Filtering Process Portion of Driving Force Signal)

The filtering process portion 200 of driving force signal receives the driving force determination signal Fhat and filters the signal Fhat with various filtering processes to obtain the driving force after filtering hf. In more detail, the filtering process portion 200 inputs the driving force determination signal Fhat to a low-pass filter 210 and removes the high frequency noise which is equal to or more than a first cut-off frequency f1 included in the driving force determination signal Fhat. The main cause of the high frequency noise is the sensor noise included in the engine rpm ne and the turbine rotational speed nt which are used for obtaining the driving force determination signal Fhat.

The microcomputer then inputs the output from the low-pass filter 210 to a notch filter 220. The notch filter 220 is a filter for removing a frequency component between a second out-off frequency f2, which is smaller than the first cut-off frequency f1 and a third cut-off frequency f3, which is smaller than the second cut-off frequency f2. The same notch filter 220 is used at the filtering process portion 400 of the acceleration signal.

The microcomputer then inputs the output from the notch filter 220 to a high-pass filter 230. The high pass filter 230 is a filter for removing a frequency component equal to or less than a fourth cut-off frequency f4 of 1 to 2 Hz which is smaller than the third cut-off frequency f3. The same high-pass filter 230 is used for removing the influence by the road Inclination $\theta$.

Thus the filter process portion of driving force 200 obtains the driving force after filtering hf.

(Acceleration Calculation Portion)

Figure 12:
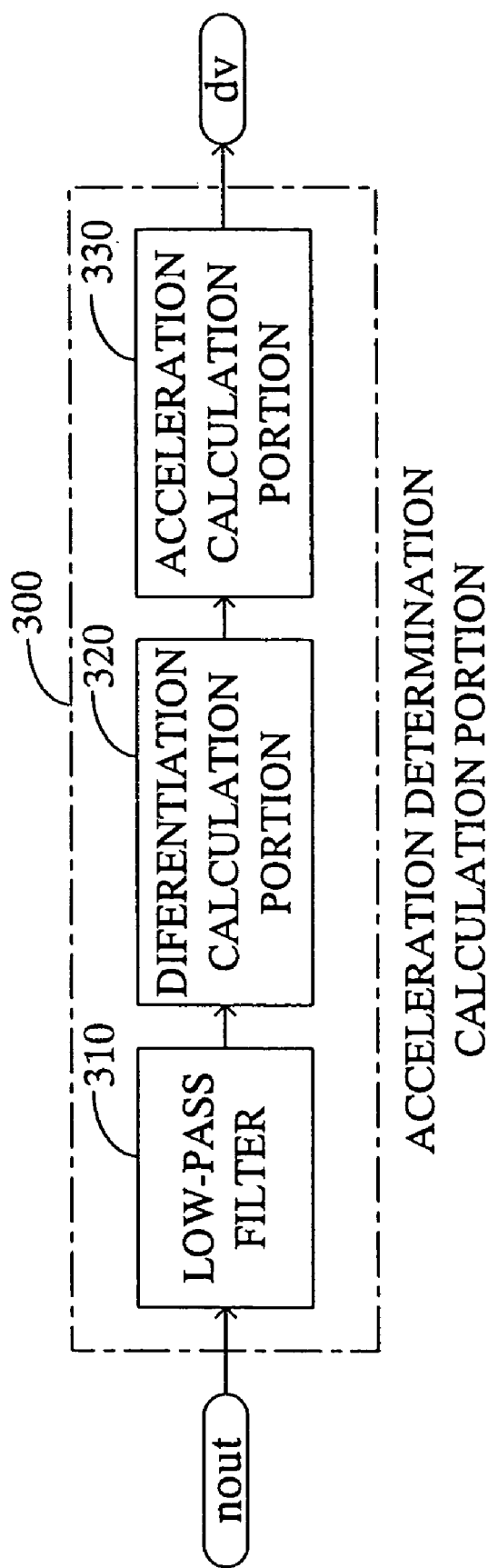
FIG. 12 is a functional block showing the detail of the program at filtering process of the acceleration determination calculation part shown in FIG. 9.

The microcomputer executes the program in the acceleration calculation portion 300 shown in detail in FIG. 12 every predetermined time ts (for example 20 msec) to obtain acceleration dv. In more detail, microcomputer receives the output shaft rotational speed nout and inputs to the low-pass filter 310 to remove the noise included in the output shaft rotational speed nout.

The microcomputer then inputs the output from the low-pass filter 310 to differentiating process portion 320. The differentiating process portion 320 obtains a signal dn corresponding to the vehicle acceleration by substantially differentiating the output shaft rotational speed nout by the difference between the present output shaft rotational speed nout (output of the filter 310) and the output shaft rotational speed nout (output of the filter 310) before the predetermined time ts. The obtained signal dn is inputted to the acceleration calculation portion 330 for obtaining the acceleration signal dv by multiplying the signal dn by a predetermined constant to convert the rotational speed into acceleration.

(Filtering Process Portion of Acceleration Signal)

Figure 13:
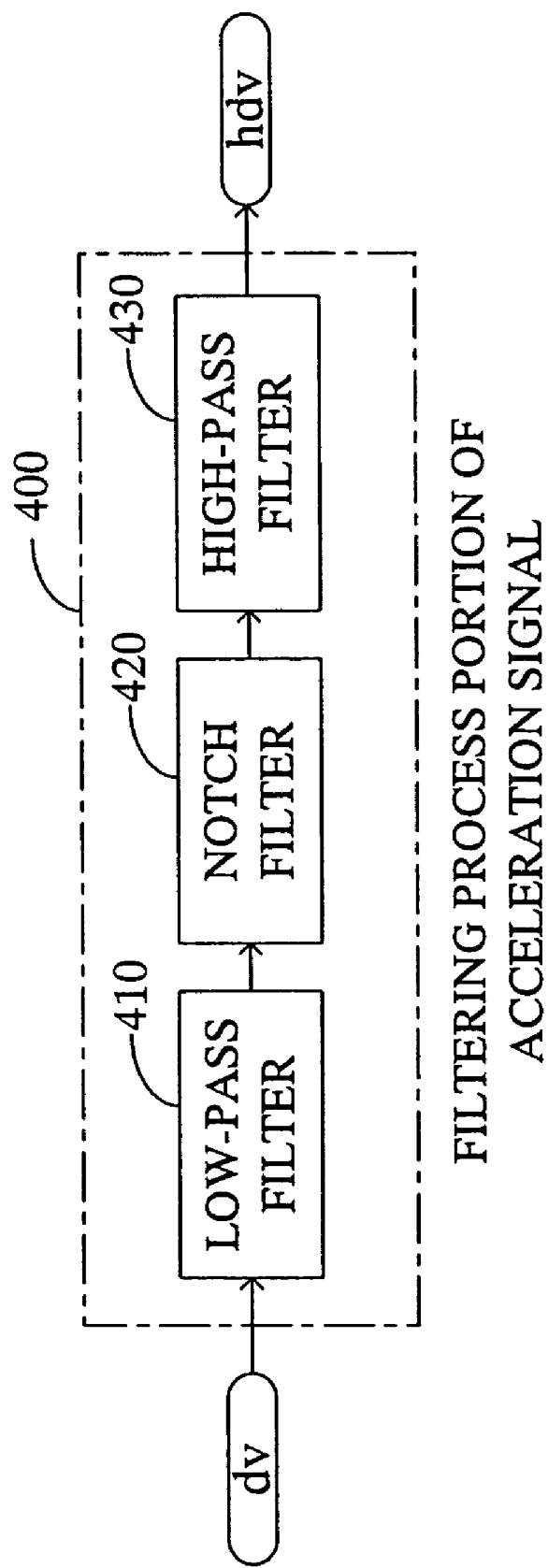
FIG. 13 is a functional block showing the detail of the program at filtering process part of the acceleration determination signal shown in FIG. 9.

The filtering process portion 400 of acceleration signal receives the acceleration dv as shown in FIG. 13 and filters the signal dv in a manner described in the filter process portion 200 of driving force to obtain the acceleration after filtering hdv. In more detail, the filtering process portion 400 inputs the acceleration dv to the low-pass filter 410 and removes the high frequency noise which is equal to or more than the first cut-off frequency f1 included in the acceleration dv.

The microcomputer then inputs the output from the low-pass filter 410 to a notch filter 420. The notch filter 420 is a filter for removing a frequency component between the second cut-off frequency f2, which is smaller than the first cut-off frequency f1 and the third cut-off frequency f3, which is smaller than the second cut-off frequency f2. The notch filter 420 is used for removing the vibration (variation) component included in the acceleration dv due to the torsion from the drive train and the vibration of the suspension system.

The microcomputer then inputs the output from the notch filter 420 to a high-pass filter 430. The high pass filter 430 is a filter for removing the frequency component equal to or less than the fourth cut-off frequency f4. The high-pass filter 430 is used for removing the influence by the road inclination θ to obtain the acceleration after filtering hdv. The second cut-off frequency f2 may be greater than the first cut-off frequency f1 or the third cut-off frequency f3 may be greater than the fourth cut-off frequency f4 depending on the vehicle model. In such case, the notch filter 420 may be substituted for the low-pass filter 410 or the high-pass filter 430.

(Integration Permitting Portion)

Figure 14:
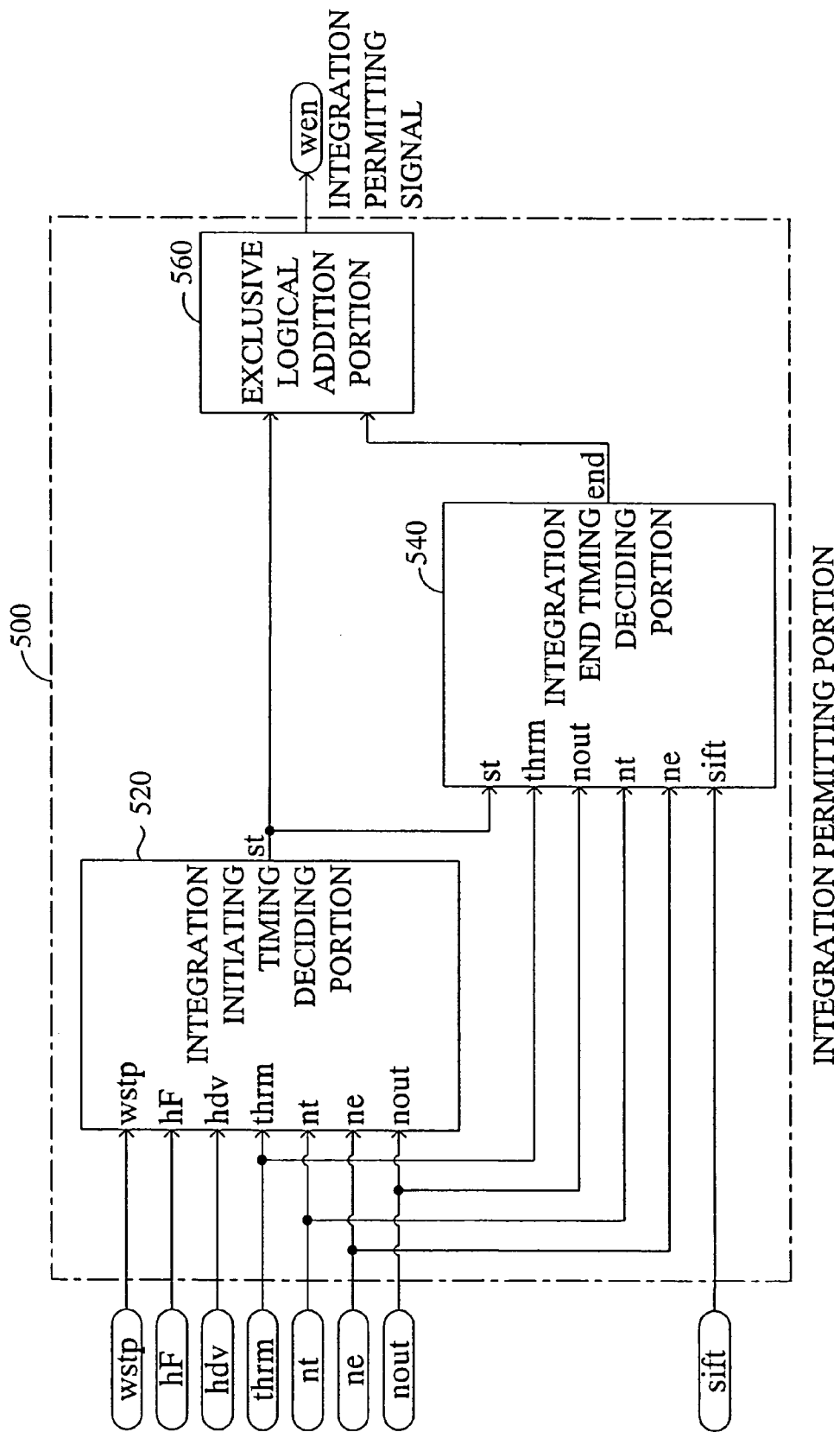
FIG. 14 is a functional block showing the detail of the program at integration permitting part shown in FIG. 9.

The integration permitting portion 500 is a program for determining the integration period (initiation timing t1 and end timing t2) for determining the vehicle weight based on the theory noted before. As shown in FIG. 14, the portion 500 includes an integration initiating timing deciding portion 520 which changes the integration initiation signal st from 0 to 1 by detecting the vehicle being under starting, an integration end deciding portion 540 which changes the integration end signal "end" from 0 to 1 by detecting the speed ratio e reaching the peak value, and an exclusive logical addition portion 560.

Figure 15:
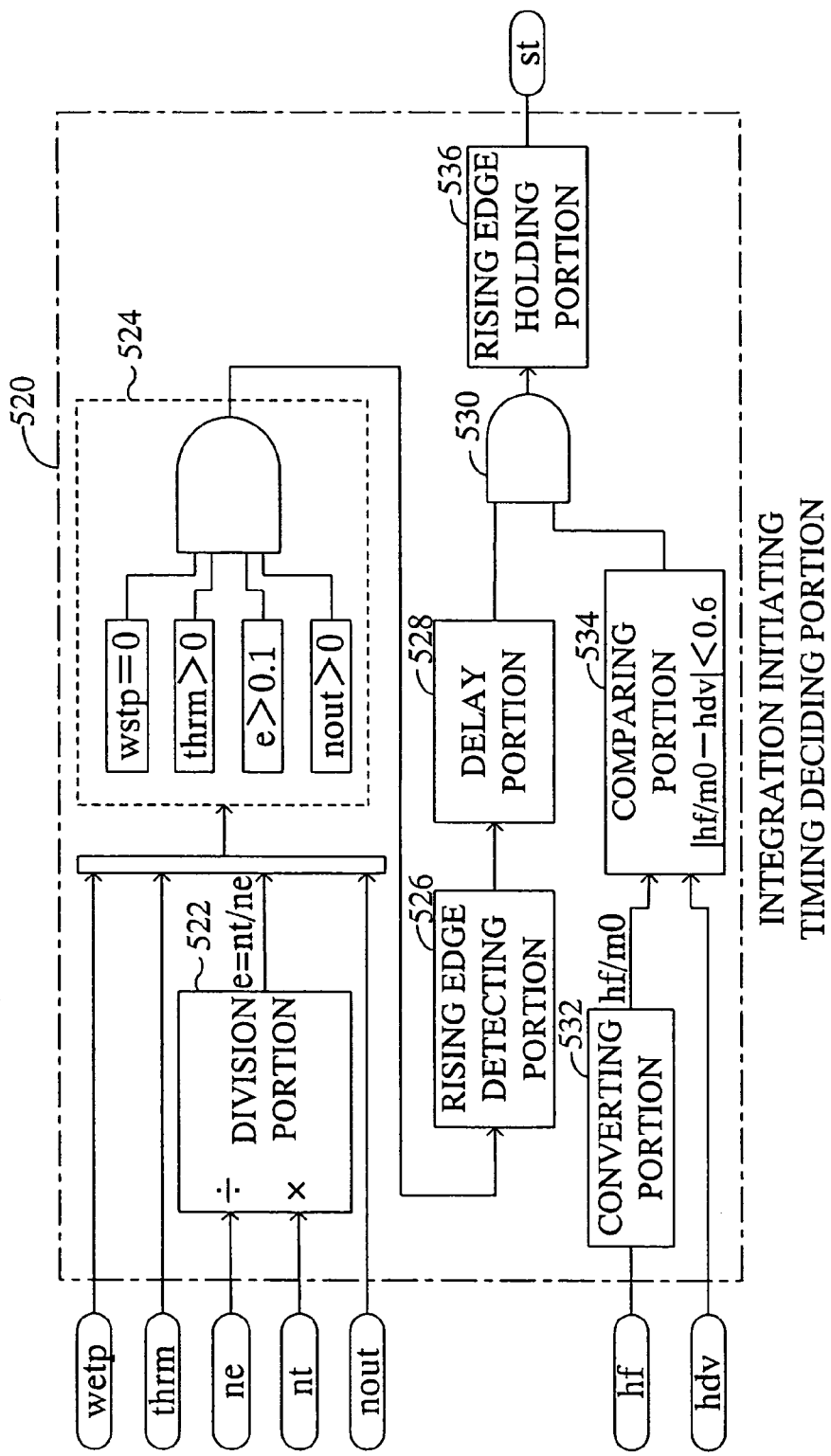
FIG. 15 is a functional block showing the detail of the program at integration initiating timing determination part shown in FIG. 14.

As shown in FIG. 15, the integration initiating timing deciding portion 520 calculates the speed ratio e (e=nt/ne) by inputting the engine rpm ne and turbine rotational speed nt every predetermined time ts at the division portion 522 and then logical judging portion 524 judges whether the brake is not operated (wstp=0), the throttle valve opening is greater than 0 (thrm>0), the speed ratio e is greater than a predetermined value (for example e>0.1) and whether the vehicle speed is greater than 0 (nout>0) by inputting brake operation signal wstp, throttle valve opening thrm, speed ratio e, and output shaft rotational speed nout. In case these conditions are established, the logical judging portion 524 changes a signal (for example flag) showing that the vehicle is under starting condition from 0 (low level) to 1 (high level). The logical judging portion 524 which functions as a vehicle start condition judging means thus Judges the vehicle starting condition.

The microcomputer detects the output signal from the logical judging portion 524 being changed from 0 to 1 at a rising edge detecting portion 526 detecting rising of signal change from 0 to 1. Thus detected signal change is outputted to the logical multiplication portion 530 after a predetermined delay time TD (here, 180 msec) by a delay portion 528. The reason of delaying the time TD for delaying the integration initiating timing by time TD from the time that the speed ratio e becomes greater than the predetermined value (for example, as mentioned, 0.1), which is the time that the signal from the logical judging portion 524 changes from 0 to 1, is that such time TD is necessary for processing filtering at the filtering process portion of driving signal 200 and the filtering process portion of acceleration signal 400. If such delay time TD is ignored and the integration of the acceleration after filtering hdv and the driving force after filtering bf is initiated without delay, the influence by the road inclination may not sufficiently removed.

The microcomputer calculates the value hf/m0 (driving force, after filtering hf divided by vehicle standard weight m0) at a converting portion 532 and compares the value hf/m0 with the acceleration after filtering hdv at a comparing portion 534. The comparing portion 534 judges whether the absolute value difference (|hf/m0−hdv|) is smaller than a predetermined value (for example, 0.6) and if judged to be small, the comparing portion 534 outputs a signal (flag) changing from 0 to 1.

The logical multiplication portion 550 inputs the signals from the delay portion 528 and the comparing portion 534 and outputs to a rising edge holding portion 536 and the rising edge holding portion 536 detects the rising of the output signal from the logical multiplication portion 530 and changes the integration initiating signal st to 1 as an output thereof, when such rising edge is detected.

The integration initiating timing deciding portion 520 judges at the logical judging portion 524 whether the condition that the speed ratio e is greater than the predetermined value (here, 0.1) is established or not. If such condition is established, it allows the integration initiation and the comparing portion 534 judges whether the acceleration after filtering hdv becomes substantially equal to the value (hf/m0) and if so judged, changes the integration initiating signal st to 1 for allowing the integration initiation.

Figure 16:
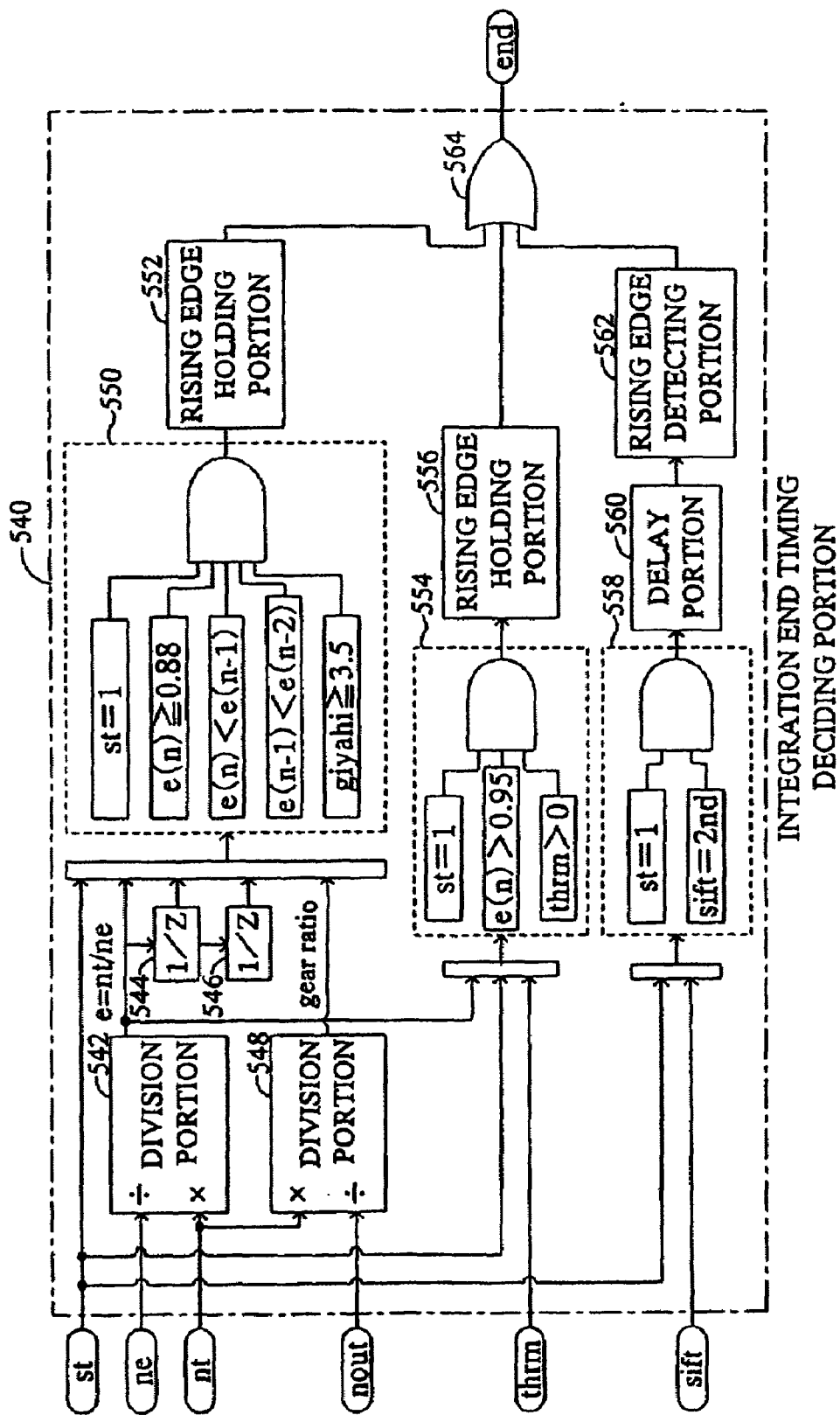
FIG. 16 is a functional block showing the detail of the program at integration end timing determination part shown in FIG. 14.

The integration end timing deciding portion 540 as shown in FIG. 16 calculates the speed ratio e (e=nt/ne) by inputting the engine rpm ne and the turbine rotational speed nt every predetermined time ts at the division portion 542 and holds the speed ratio e which has been calculated last time before the predetermined time ts at a holding portion 544 and holds the speed ratio e detected prior to the last time before the predetermined time ts at another holding portion 546. The integration end timing deciding portion 540 calculates a gear ratio (gear ratio=nt/nout) by inputting the turbine rotational speed nt and the output shaft rotational speed nout every predetermined time ts at a division portion 548.

The integration end timing deciding portion 540 judges at the logical judging portion 550 whether the integration is initiated (st=1), the current speed ratio e(n) is more than a first threshold value (for example, 0.8), the current speed ratio is smaller than the previously calculated speed ratio {e(n)<e(n−1)}, the previously calculated speed ratio is smaller than the speed ratio calculated prior to the previously calculated speed ratio {e(n−1)<e(n−2)}, and whether the gear ratio corresponds to the gear ratio at the 1st speed change stage (for example, gear ratio<3.5) by inputting signals of integration initiation st, the currently detected speed ratio e(n), the speed ratio e(n−1) detected prior to the speed ratio e(n), speed ratio e(n−2) detected prior to speed ratio e(n−1), and gear ratio. If all conditions are established, the signal indicating such established condition is outputted with the change from 0 to 1. The rising edge holding portion 552 detects the rising edge of the output signal from the logical judging portion 550 and maintains the output to 1.

The reason for judging at the logical judging portion 550 whether the speed ratio e (n) is smaller than the speed ratio e (n−1) and the speed ratio e (n−1) is smaller than the speed ratio e (n−2), in other words, whether the speed ratio e is consecutively decreased by the twice timing sampling, is for detecting the peak value of the speed ratio. Further one of the conditions that the speed ratio e (n−1) is greater than the first threshold value is necessary because when the speed ratio e is less than the first threshold value, even if the speed ratio is decreased twice consecutively due to any noise, such speed ratio is not to be considered as the peak value. Another condition that the gear ratio shall be more than the predetermined value is also necessary to limit the peak value detection only to the first speed change stage.

The integration end timing deciding portion 540 includes a logical judging portion 554 which is provided for ending or terminating the integration in case the speed ratio peak value cannot be detected. The logical judging portion 554 judges the conditions whether the integration has been initiated (st=1), the current speed ratio e(n) is equal to or greater than a second threshold value which is greater than the first threshold value (the value that the speed ratio is saturated for example the value of 0.95) and the throttle valve is not fully closed (thrm>0) by inputting the signals st, e(n) and thrm.

If the above conditions are all met, the logical judging portion 554 changes the signal from 0 to 1. A rising edge holding portion 556 detects the rising of the output from the logical judging portion 554 and maintains the output signal to 1 when the rising edge is detected.

The integration end timing deciding portion 540 further includes a logical judging portion 558. The logical judging portion 558 judges the conditions whether the integration has been initiated (st=1), speed change signal sift indicates the second speed change stage by inputting the signals st, sift.

If the above conditions are all met, the logical judging portion 558 changes the signal from 0 to 1 (high level) to indicate the establishment of the conditions. A delay portion 560 delays the high level output signal from the logical judging portion 558 for a predetermined time TH (here, 500 msec). A rising edge detecting portion 562 detects the rising of the output from the delay portion 560 and maintains the output signal to 1 when the rising edge is detected.

Each output from the rising edge holding portions 552, 556 and the rising edge detecting portion 562 is inputted to the logical addition portion 564 and accordingly, when one of the inputs becomes 1, the logical addition portion 564 changes the integration end signal (end) from 0 to 1 to indicate the termination of integration to the area comparing portion 600.

The logical judging portion 558 is provided for terminating the integration when the speed change stage is shifted to the second speed. The delay portion 560 is provided for delaying the termination of the integration presuming that it takes some time to actually shift the gear from first to second when the speed change signal sift indicates the change from the first to second.

The signals (st and end) of integration initiation and termination decided by the integration initiating timing deciding portion 520 and the integration end timing deciding portion 540, respectively are inputted to the exclusive logical addition portion 560 as shown in FIG. 14. The exclusive logical addition portion 560 changes an integration permitting signal wen to 1 when either one of the signals (st or end) is detected and keeps the signal wen to 0 when both signals indicate 0 or 1.

Figure 17:
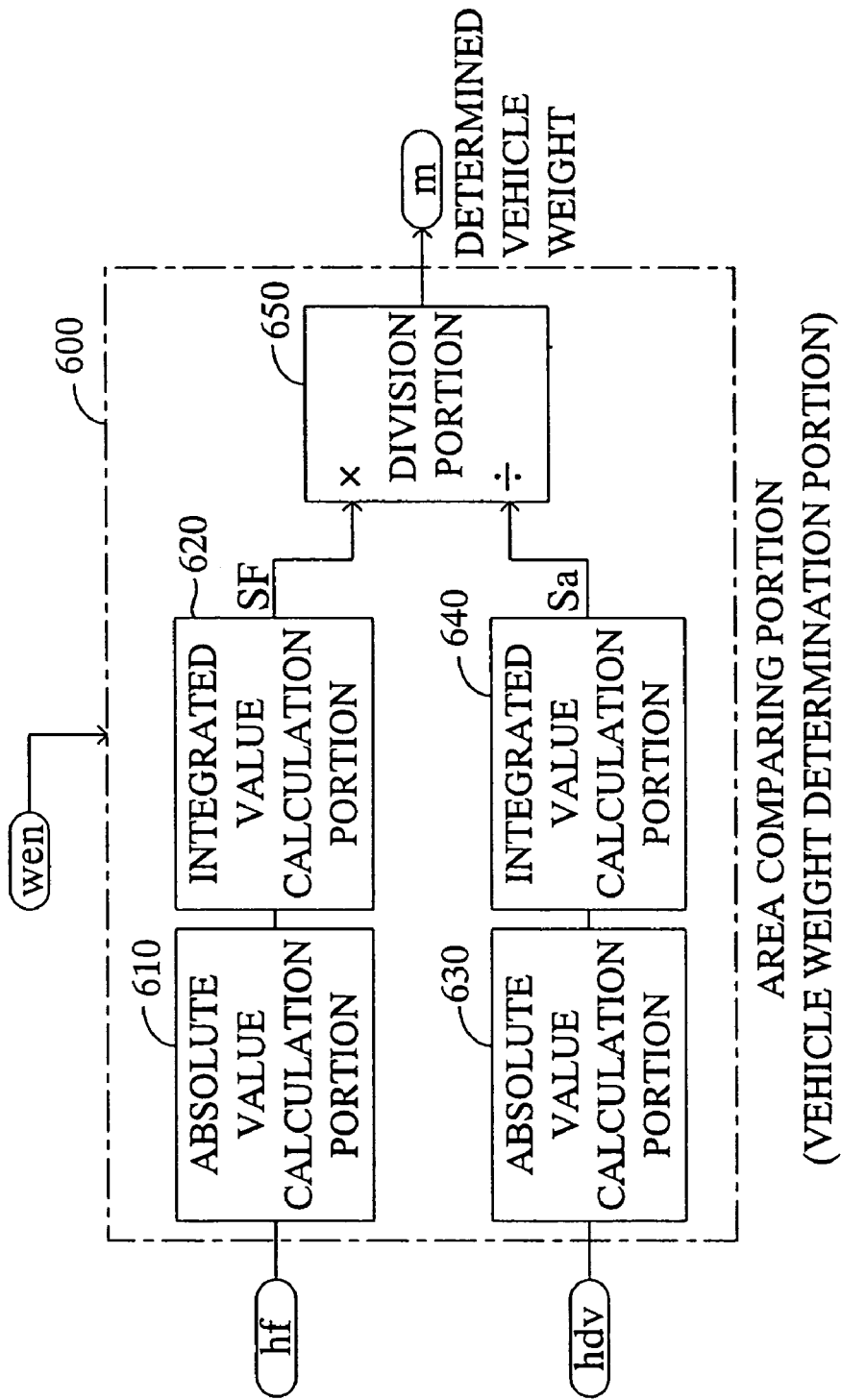
FIG. 17 is a functional block showing the detail of the program at area comparison part shown in FIG. 9.

As shown in FIG. 17, the area comparing portion 600 integrates the driving force after filtering hf and the acceleration after filtering hdv and determines the vehicle weight m based on the equation 8. In more detail an absolute value calculating portion 610 obtains the absolute value hf of the driving force after filtering hf and outputs to an integration value calculating portion 620. The integration value calculating portion 620 integrates the absolute value |hf| of the driving force after filtering hf according to the equation 8. The integration initiating timing t1 is the timing when the integration permitting signal wen is changed from 0 to 1 and the integration end timing t2 is the timing when the integration permitting signal wen is changed from 1 to 0. Practically, the value equal to the integrated driving force value SF can be obtained by multiplying the integrated value S which has been obtained every sampling timing by the forgetting factor Λ and adding the absolute value |hf| of the driving force after filtering hf obtained by the present sampling to the integrated value S and multiplying this newly obtained integrated value S by sampling period T (=ts).

The area comparing portion 600 also is applied to obtain the integrated acceleration value similar to the integrated driving force. In more detail, an absolute value calculating portion 630 obtains the absolute value |hdv| of the acceleration after filtering hdv and integrates |hdv| to obtain the integrated acceleration value Sa at an integration value calculating portion 640 according to the equation 8. The integration initiating timing t1 is the timing when the integration permitting signal wen is changed from 0 to 1 and the integration and timing t2 is the timing when the integration permitting signal wen is changed from 1 to 0. Practically, the value equal to the integrated acceleration value Sa can be obtained by multiplying the integrated value S which has been obtained every sampling timing by the forgetting factor Λ and adding the absolute value |hdv| of the acceleration after filtering hdv obtained by the present sampling to the integrated value S and multiplying this newly obtained integrated value S by sampling period T (=ts).

The area comparing portion 600 then determines (presumes) the vehicle weight m (=SF/Sa) at the integration end timing t2 (or any timing after the integration end timing t2) by dividing the integrated driving force SF by the integrated acceleration value Sa at a division portion 650.

As explained, according to the vehicle weight determination device according to the present invention, the device includes means for obtaining the driving force after filtering hf and the acceleration after filtering hdv and means for integrating the absolute values thereof for a predetermined period of time. The predetermined period of time is defined between the time that the vehicle is under starting condition and the noise in the acceleration after filtering is not large (the time the value of acceleration after filtering becomes substantially equal to the value defined by the driving force after filtering (hf/m0)) and the time the speed ratio e reaches the peak value. Further, the forgetting factor is introduced to integrate the absolute value of the acceleration after filtering hdv and the driving force after filtering hf for reducing the noise included in the parameters to accurately presume or determine the vehicle weight.

The invention is not limited to the embodiments described above and various modifications and improvements are included within the scope of the invention. For example, the speed ratio e is obtained from the multiplication value λ·Cp map in the embodiment of the invention, but the speed ratio e can be obtained by multiplication of independently obtained values of the torque amplification ratio λ and capacity factor Cp, instead of preparing such map.

The integration initiating timing t2 can be obtained at the timing of the output from the logical judging portion 524 being changed from 0 to 1, stead of providing a particular comparing portion such as the comparing portion 534. Further, the integration end timing t2 can be defined at the time the speed ratio becomes the peak value or a predetermined time after or before the speed change signal sift indicating the change from first to second speed change. The forgetting factor is introduced in the embodiment, but it is not necessary to define the value as 1.

According to the invention, the influence of the road inclination has been removed from the detected acceleration for obtaining the acceleration after filtering in which such noise derived from the road condition has been removed. Corresponding to this removal of the noise, the noise in the driving force after filtering also has been removed to improve the determination of the vehicle weight. Since the removal of the noise from the driving force and acceleration after filtering enables the accuracy of integration of these values.

According to the invention, the acceleration and the driving force after filtering are integrated by using the absolute values thereof to increase the integrated values for accurately determine the vehicle weight by reducing the noise.

The values corresponding to the absolute values of the acceleration after filtering and the driving force after filtering include a multiplication of a coefficient (forgetting factor), which becomes smaller in proportion to the time lapse.

According to the invention, acceleration and driving force are integrated multiplied with a coefficient, which becomes large in accordance with the time lapse. This can minimize the inaccuracy of data included at the beginning of integration to improve the accuracy of determination of the vehicle weight.

According to the invention, the vehicle start condition is judged by the speed ratio of the torque converter to avoid the potential influence generated at the time of vehicle starting.

According to the invention, the integration initiating timing is determined by the time that the acceleration after filtering is substantially equal to a value of driving force after filtering divided by a standard vehicle weight to avoid the noise from the drive train derived by the torsion or vibration.

According to the inventions the integration end timing is determined by the peak value of the speed ratio at the vehicle starting to avoid the noise influence derived from the unstable speed ratio derived from the speed change shifting from first to second.

What is claimed is:

1. A vehicle weight determination device comprising:
an acceleration detecting means for detecting vehicle acceleration;
a driving force determining means for determining vehicle driving force;
an acceleration obtaining means for obtaining an acceleration after filtering by removing low frequency component included in the detected acceleration by the acceleration detecting means;
a driving force obtaining means for obtaining a driving force after filtering by removing a low frequency component included in the determined driving force determined by the driving force determining means;
an acceleration integrating means for integrating a value corresponding to the absolute value of the acceleration after filtering for a predetermined period of time to obtain an integrated acceleration value;
a driving force integrating means for integrating a value corresponding to the absolute value of the driving force after filtering for the predetermined period of time to obtain an integrated driving force value; and
a vehicle weight determining means for determining a vehicle weight based on the integrated acceleration value and the integrated driving force value.

* * * * *